United States Patent
Pikhur et al.

(10) Patent No.: US 9,984,230 B2
(45) Date of Patent: May 29, 2018

(54) PROFILING EVENT BASED EXPLOIT DETECTION

(71) Applicant: McAfee, LLC, Plano, TX (US)

(72) Inventors: Volodymyr Pikhur, Beaverton, OR (US); Rachit Mathur, Hillsboro, OR (US)

(73) Assignee: McAfee, LLC, Plano, TX (US)

( * ) Notice: Subject to any disclaimer, the term of this patent is extended or adjusted under 35 U.S.C. 154(b) by 179 days.

(21) Appl. No.: 14/751,762

(22) Filed: Jun. 26, 2015

(65) Prior Publication Data

US 2016/0378975 A1    Dec. 29, 2016

(51) Int. Cl.
*H04L 29/00* (2006.01)
*G06F 21/52* (2013.01)
*G06F 21/55* (2013.01)

(52) U.S. Cl.
CPC ............ *G06F 21/52* (2013.01); *G06F 21/554* (2013.01)

(58) Field of Classification Search
CPC .............................. G06F 21/52; G06F 21/554
USPC ........................................................ 726/23
See application file for complete search history.

(56) References Cited

U.S. PATENT DOCUMENTS

| | | | |
|---|---|---|---|
| 5,987,610 | A | 11/1999 | Franczek et al. |
| 6,073,142 | A | 6/2000 | Geiger et al. |
| 6,460,050 | B1 | 10/2002 | Pace et al. |
| 7,506,155 | B1 | 3/2009 | Stewart et al. |
| 2003/0145230 | A1* | 7/2003 | Chiu ................ G06F 13/28 709/217 |
| 2005/0246522 | A1 | 11/2005 | Samuelsson et al. |
| 2009/0248611 | A1* | 10/2009 | Xu .................... G06F 9/45533 |
| 2011/0214187 | A1* | 9/2011 | Wittenstein ......... H04L 63/1425 726/25 |
| 2011/0265182 | A1 | 10/2011 | Peinado et al. |
| 2012/0255013 | A1 | 10/2012 | Sallam |
| 2013/0227680 | A1 | 8/2013 | Pavlyushchik |
| 2015/0067763 | A1 | 3/2015 | Dalcher et al. |

FOREIGN PATENT DOCUMENTS

WO    2016209449 A1    12/2016

OTHER PUBLICATIONS

International Search Report and Written Opinion in International Application No. PCT/US2016/033691, dated Aug. 8, 2016, 13 pages.

* cited by examiner

*Primary Examiner* — Jeffrey Pwu
*Assistant Examiner* — Michael D Anderson
(74) *Attorney, Agent, or Firm* — Patent Capital Group

(57) ABSTRACT

Particular embodiments described herein provide for an electronic device that can be configured to execute an application in a system with an operating system, perform event tracing for the application, analyze each instruction pointer from the event tracing, and determine if an instruction pointer points to an orphan page of memory. The orphan page can be a region of code that is not associated with the application, a region of code that is unidentified, or unusual code that is not associated with the application. In addition, the event tracing can be an embedded application that is part of the operating system.

25 Claims, 7 Drawing Sheets

PROFILING EVENT BASED EXPLOIT DETECTION

TECHNICAL FIELD

This disclosure relates in general to the field of information security, and more particularly, to profiling event based exploit detection.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
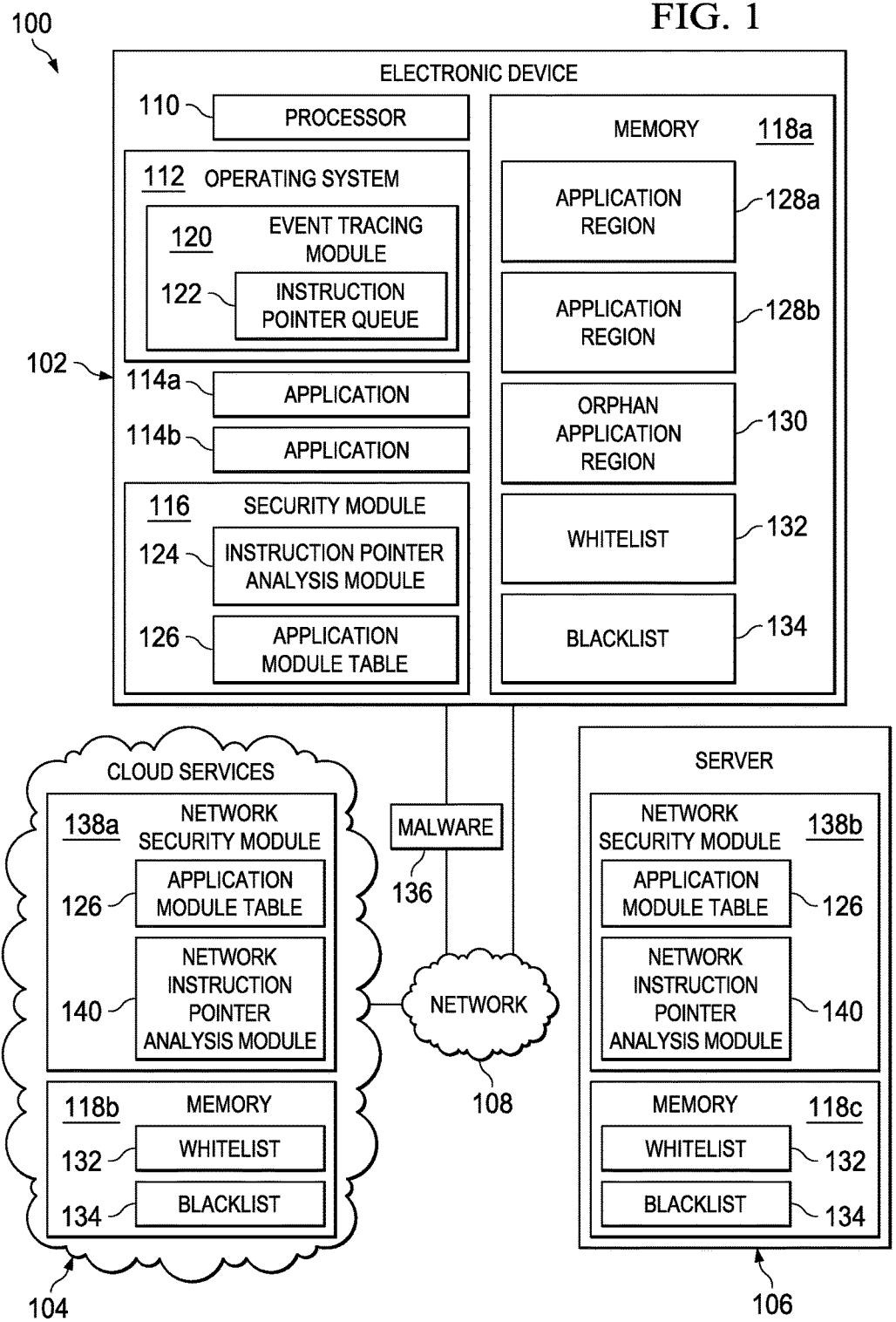
FIG. 1 is a simplified block diagram of a communication system for profiling event based exploit detection in a network environment in accordance with an embodiment of the present disclosure.

FIG. 1 is a simplified block diagram of a communication system 100 for profiling event based exploit detection in a network environment in accordance with an embodiment of the present disclosure. Communication system 100 can include an electronic device 102, cloud services, 104, and a server 106. Electronic device 102 can include a processor 110, an operating system (OS) 112, one or more applications 114a and 114b, a security module 116, and memory 118a. OS 112 can include an event tracing module 120. Event tracing module 120 can include an instruction pointer queue 122. Security module 116 can include instruction pointer analysis module 124 and an application module table 126. Memory 118a can include one or more application regions 128a and 128b, an orphan application region 130, whitelist 132, and blacklist 134. Cloud services 104 can include memory 118b and a network security module 138a. Memory 118b can include whitelist 132 and blacklist 134. Network security module 138a can include application module table 126 and network instruction pointer analysis module 140. Server 106 can include memory 118c and a network security module 138b. Memory 118c can include whitelist 132 and blacklist 134. Network security module 138b can include application module table 126 and network instruction pointer analysis module 140. Electronic device 102, cloud services 104, and server 106 can be in communication using network 108. Malware 136 may attempt to introduce itself to electronic device 102 using network 108 or through a direct connection (e.g., through a Universal Serial Bus (USB) type connection).

In example embodiments, communication system 100 can be configured to execute an application (e.g., application 114a) in a system with an OS (e.g., OS 112), perform event tracing for the application using event tracing module 120, analyze each instruction pointer from the event tracing using instruction pointer analysis module 124, and determine if an instruction pointer points to an orphan page of memory (e.g., orphan application region 130). The orphan page can be a region of code that is not associated with the application, a region of code that is unidentified, or unusual code that is not associated with the application. In addition, the event tracing can be an embedded application or feature that is part of the OS. Application module table 126 can include a list of modules or memory regions associated with a process. For example, application 114a may be associated with application region 128a and application 114b may be associated with application region 128b.

Elements of FIG. 1 may be coupled to one another through one or more interfaces employing any suitable connections (wired or wireless), which provide viable pathways for network (e.g., network 108) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

For purposes of illustrating certain example techniques of communication system 100, it is important to understand the communications that may be traversing the network environment. The following foundational information may be viewed as a basis from which the present disclosure may be properly explained.

Increased access to the Internet has had the unintended effect of increasing the reach of malware. The term malware as used herein includes any type of software program, application, module, code, etc. designed to infiltrate, modify, change, corrupt, or damage a computer system without the owner's informed consent, regardless of the motivation for the software program, and regardless of the results caused by the software program on the owner's devices, systems, networks, or data.

Some malware can take advantage of exploits in document viewers (e.g., Microsoft® Word®, Adobe® viewers, browsers, etc.). For example, a business may get a Word® or PDF® formatted document which may actually be a targeted zero-day attack. When an electronic device in the business opens or reads the document, the malware can compromise the electronic device. In another example, an electronic device may be used to visit a website and malware may unknowingly get installed on the electronic device using exploits from the website.

Current solutions to the problem are often invasive and have performance or compatibility concerns. For example, sandboxing or emulation based solutions to detect malicious applications try to run third-party software under controlled environments. This can have serious compatibility issues with the electronic device, substantially degrade performance of the electronic device by consuming a relatively large amount of resources, and can create performance bottlenecks making the solutions infeasible to deploy on electronic devices. Other solutions can have performance and compatibility concerns or are based on specific knowledge of an already known vulnerability. In addition, various detection programs may be used to attempt to detect the presence of malware. In some instances, the detection programs rely on detecting a signature in a software program being examined to determine if the program is or contains malware. In some instances, the detection program uses a tracing method to determine whether a software program is malware. However, malware authors frequently change or alter parts of the malware programs in order to avoid detection by tracing methods. What is needed a malware detection system and method that does not require the target program or suspected malware to run under a controlled environment or use OS control flow interception. It would be beneficial if the system and method could use well supported OS features (e.g., Microsoft Windows® features) to generically identify arbitrary code execution in processes such as document viewers, browsers, etc.

A communication system for profiling event based exploit detection, as outlined in FIG. 1, can resolve these issues (and others). In communication system 100 of FIG. 1, the system may be configured to use event tracing features of an OS to identify the memory regions that are being executed under a given target process. Based on identified memory regions, communication system 100 can be configured to determine if an exploit has taken place in the target application by checking if the target application is executing code from regions that are unidentified or if the code executing inside pages is unusual. In a specific illustrative example, event tracing for Windows (ETW) is a Microsoft Windows® feature where the ETW provides NT Kernel related events including ETW profiling events. The ETW profiling events typically include instruction-pointers (IP) for any given process. This information can be used to identify the memory regions that are being executed under a given target process (e.g., application module table 126 can be used to identify memory regions associated with a target process) and if the target application is executing code from regions that are unidentified or if the code executing inside pages is unusual.

By using the event tracing features of the OS, the analysis of a target application can be completely transparent to the targeted application and compatibility with the electronic device is not a concern. The profiling event based exploit detection can operate asynchronously and does not block or halt the target application so no perceived performance overhead is created. Also, because the OS provides all the necessary capabilities for the event tracing, driver installation, DLL components, or plugins for targeted applications, is not required and the process does not modify, inject or hook into OS processes.

In a specific example, a SampledProfile event provided by Microsoft Windows® includes information about Instruction Pointers (IP) in a given thread. This is information that Microsoft® has enabled from within the Windows® OS to aid in troubleshooting and debugging applications. The information is available to be consumed by any application (even in user-mode) using the ETW framework which is highly efficient. These events are delivered asynchronously so the target application continues execution without being blocked and the process is transparent so that the target application is not even aware of the process and there is little chance of any compatibility issues.

The IP address information from the event trace can be used to determine if arbitrary code execution has taken place in an application. For example, after receiving an event trace, the event trace can be first associated with a process and the system can determine if the process is a process that is being monitored (e.g., for attacks or if the process is associated with malware). If the process is a process that is being monitored, the IP address reported in the event can be checked against loaded modules or memory regions in application module table 126 associated with the process to determine if any execution occurred outside of the loaded modules or memory regions associated with the process. If an execution did occur outside of the loaded modules or memory regions associated with the process, then the execution is deemed to have occurred in an orphan region (e.g., orphan application region 130).

Some applications create an orphan page or region by allocating memory on heap and execute code from the heap for virtual-machine or sandbox based executions (e.g., Adobe® Reader 11). To detect this, a generic shell code detection check can be added for the intentionally created orphan page or region. Another approach to detect intentionally created orphan pages or regions is to whitelist the sandbox related code to identify the benign orphan pages and then flag any unexpected code execution within the intentionally created orphan pages.

Turning to the infrastructure of FIG. 1, communication system 100 in accordance with an example embodiment is shown. Generally, communication system 100 can be implemented in any type or topology of networks. Network 108 represents a series of points or nodes of interconnected communication paths for receiving and transmitting packets of information that propagate through communication system 100. Network 108 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic device 102, cloud services 104, and server 106, and are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, each of electronic device 102, cloud services 104, and server 106 can include memory elements for storing information to be used in the operations outlined herein. Each of electronic device 102, cloud services 104, and server 106 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as electronic device 102, cloud services 104, and server 106 may include software modules (e.g., security module 116, event tracing module 120, instruction pointer analysis module 124, network security modules 138a and 138b, and network instruction pointer module 140) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic device 102, cloud services 104, and server 106 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic device 102 can be a network element and includes, for example, desktop computers, laptop computers, mobile devices, personal digital assistants, smartphones, tablets, or other similar devices. Cloud services 104 is configured to provide cloud services to electronic device 102. Cloud services may generally be defined as the use of computing resources that are delivered as a service over a network, such as the Internet. Typically, compute, storage, and network resources are offered in a cloud infrastructure, effectively shifting the workload from a local network to the cloud network. Server 106 can be a network element such as a server or virtual server and can be associated with clients, customers, endpoints, or end users wishing to initiate a communication in communication system 100 via some network (e.g., network 108). The term 'server' is inclusive of devices used to serve the requests of clients and/or perform some computational task on behalf of clients within communication system 100. Although security module 116 is represented in FIG. 1 as being located in electronic device 102, this is for illustrative purposes only. Security module 116 could be combined or separated in any suitable configuration. Furthermore, security module 116 could be integrated with or distributed in another network accessible by electronic device 102 such as cloud services 104 or server 106.

Figure 2:
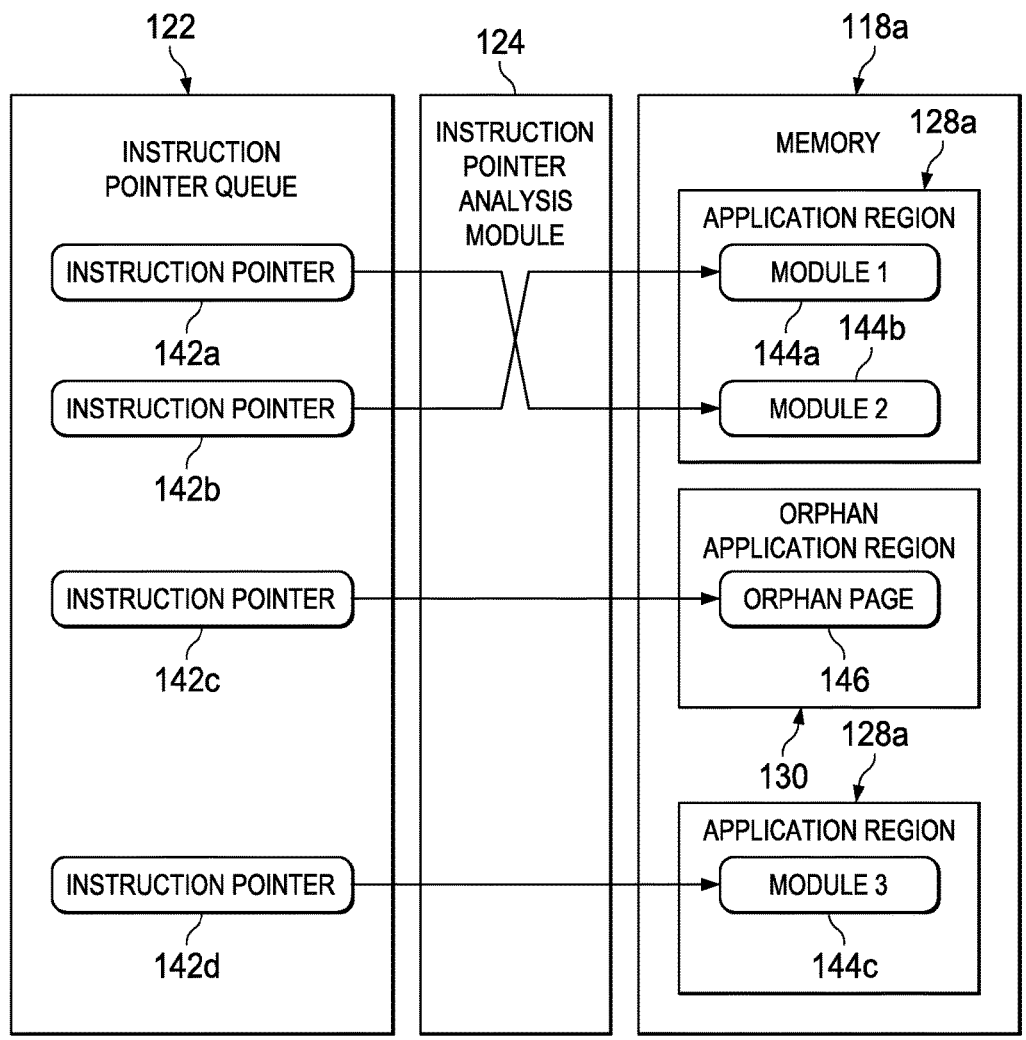
FIG. 2 is a simplified block diagram of a portion of a communication system for profiling event based exploit detection in a network environment in accordance with an embodiment of the present disclosure.

Turning to FIG. 2, FIG. 2 is a simplified block diagram of a portion of communication system 100 for profiling event based exploit detection in accordance with an embodiment of the present disclosure. Instruction pointer analysis module 124 can be configured to analyze each instruction pointer (e.g., instruction pointers 142a-142d) in instruction pointer queue 122 and determine if the pointer points to an application region (e.g., application region 128a) in memory 118a or an orphan application region 130. If the instruction pointer associated with an application (e.g., application 114a) points to an application region associated with the application, then the application is not flagged as malicious. If the instruction pointer associated with the application points to an application not associated with the application (i.e., orphan application region 130), then the application is flagged or marked as malicious. For example, instruction pointers 142a-142d may each be associated with an application. Instruction pointers 142a, 142b, and 142d each point to module 144a, 144b, and 144c in an application region 128a associated with the application. However, instruction pointer 142c points to an orphan page 146 in orphan application region 130 that is not associated with the application which can be an indication of malicious activity.

Because instruction pointer 138c points to orphan page 142, the application is flagged or marked as malicious and security module 116 can do further analysis on the application. For example, security module 116 can be configured to compare the application to entries in white list 132 and black list 134. If the application matches an entry in white list 132, the application can be determined to be trusted. If the application matches an entry in black list 134, the application can be determined to be malicious. In an example, data related to the application can be sent to network security module 138a or 138b for a more intensive analysis.

Figure 3:
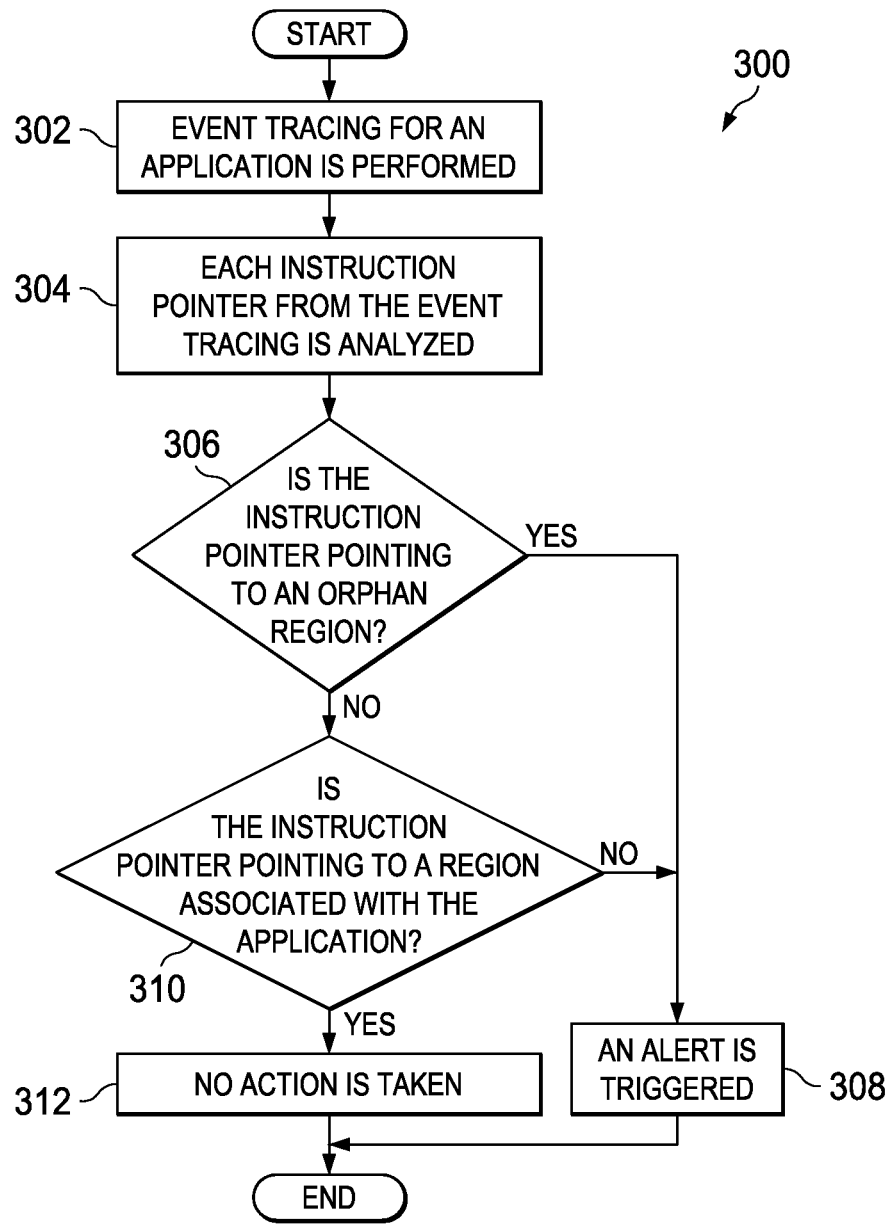
FIG. 3 is a simplified flowchart illustrating potential operations that may be associated with the communication system in accordance with an embodiment.

Turning to FIG. 3, FIG. 3 is an example flowchart illustrating possible operations of a flow 300 that may be associated with profiling event based exploit detection, in accordance with an embodiment. In an embodiment, one or more operations of flow 300 may be performed by security module 116, event tracing module 120, and instruction pointer analysis module 124. At 302, event tracing for an application is performed. At 304, each instruction pointer from the event trace is analyzed. At 306, the system determines if the instruction pointer is pointing to an orphan region. If the instruction pointer is pointing to an orphan region, then an alert is triggered, as in 308. The alert may flag the application as malicious, stop execution of the application, or some other mitigating action.

If the instruction pointer is not pointing to an orphan region then the system determines if the instruction pointer is pointer to a region associated with the application, as in 310. If the pointer is not pointing to a region associated with the application, then an alert is triggered, as in 308. If the instruction pointer is pointing to a region associated with the application, then no action is taken. For example, the application is not considered malicious and no mitigating action is taken.

Figure 4:
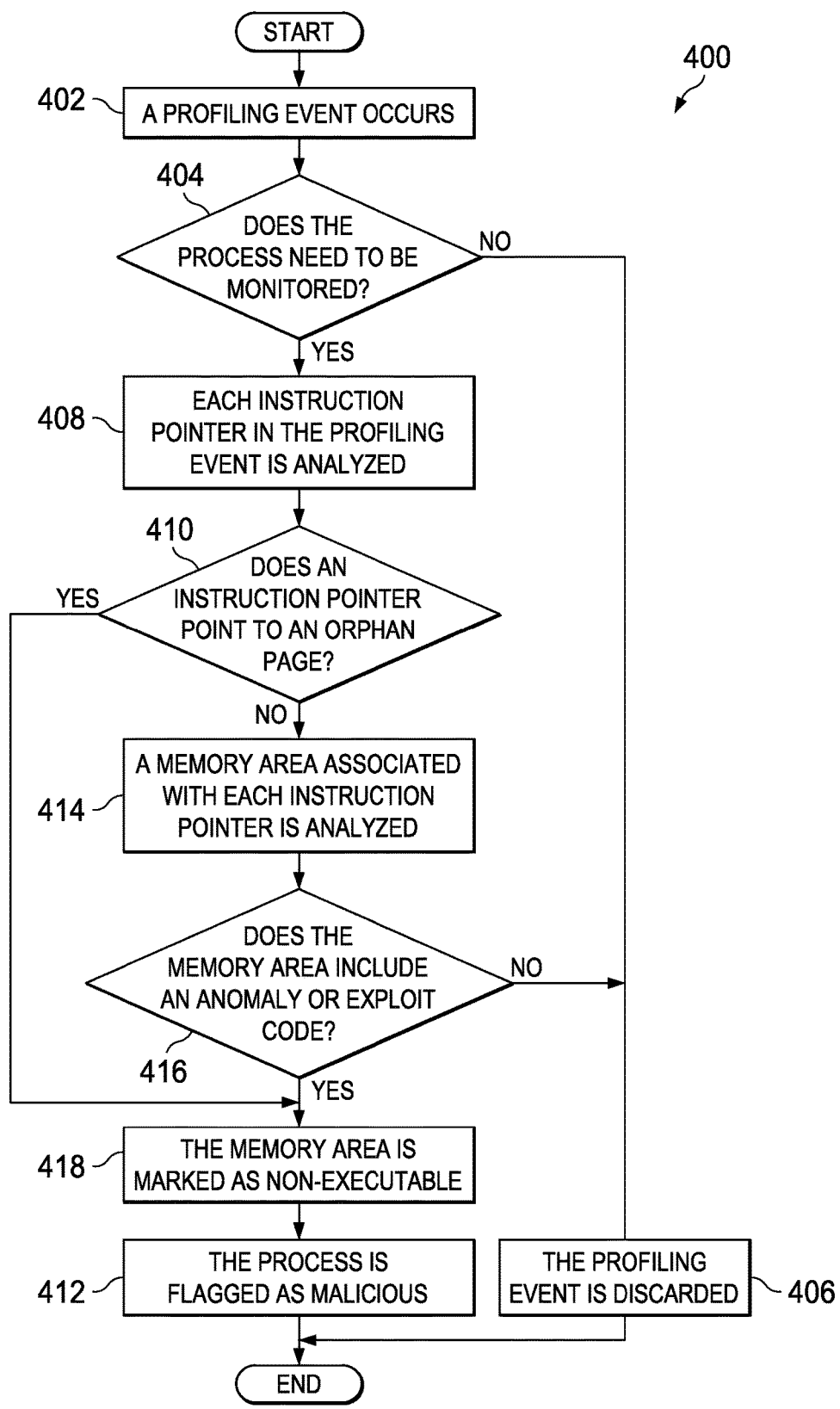
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with profiling event based exploit detection, in accordance with an embodiment. In an embodiment, one or more operations of flow 400 may be performed by security module 116, event tracing module 120, and instruction pointer analysis module 124. At 402, a profiling event occurs. The profiling event may be for a process or application (e.g., application 114a). At 404, the system determines if the process needs to be monitored. For example, the process may match an entry in whitelist 132 and be a part of a trusted process or application that does not need to be monitored or may match an entry in blacklist 134 and be part of an untrusted process or application that needs to be monitored. If the process does not need to be monitored, then the profiling event is discarded, as in 406. If the process does need to be monitored, then each instruction pointer in the profiling even is analyzed, as in 408.

At 410, the system determines if the instruction pointer points to an orphan page. If the instruction pointer points to an orphan page, then the memory area is marked as non-executable, as in 418. At 412, the process is flagged as malicious. If the instruction pointer does not point to an orphan page, then a memory area associated with each instruction pointer is analyzed, as in 414.

At 416, the system determines if the memory (associated with each instruction pointer) includes an anomaly or exploit code. If the memory does not include an anomaly or exploit code, then the profiling event is discarded as in 406. If the memory area does include an anomaly or exploit code, then the memory area is marked as non-executable, as in 418. At 412, the process is flagged as malicious. If the process is flagged as malicious, then the process may be terminated, sent to network security module 138a or 138b for further analysis, or some other mitigating action.

Figure 5:
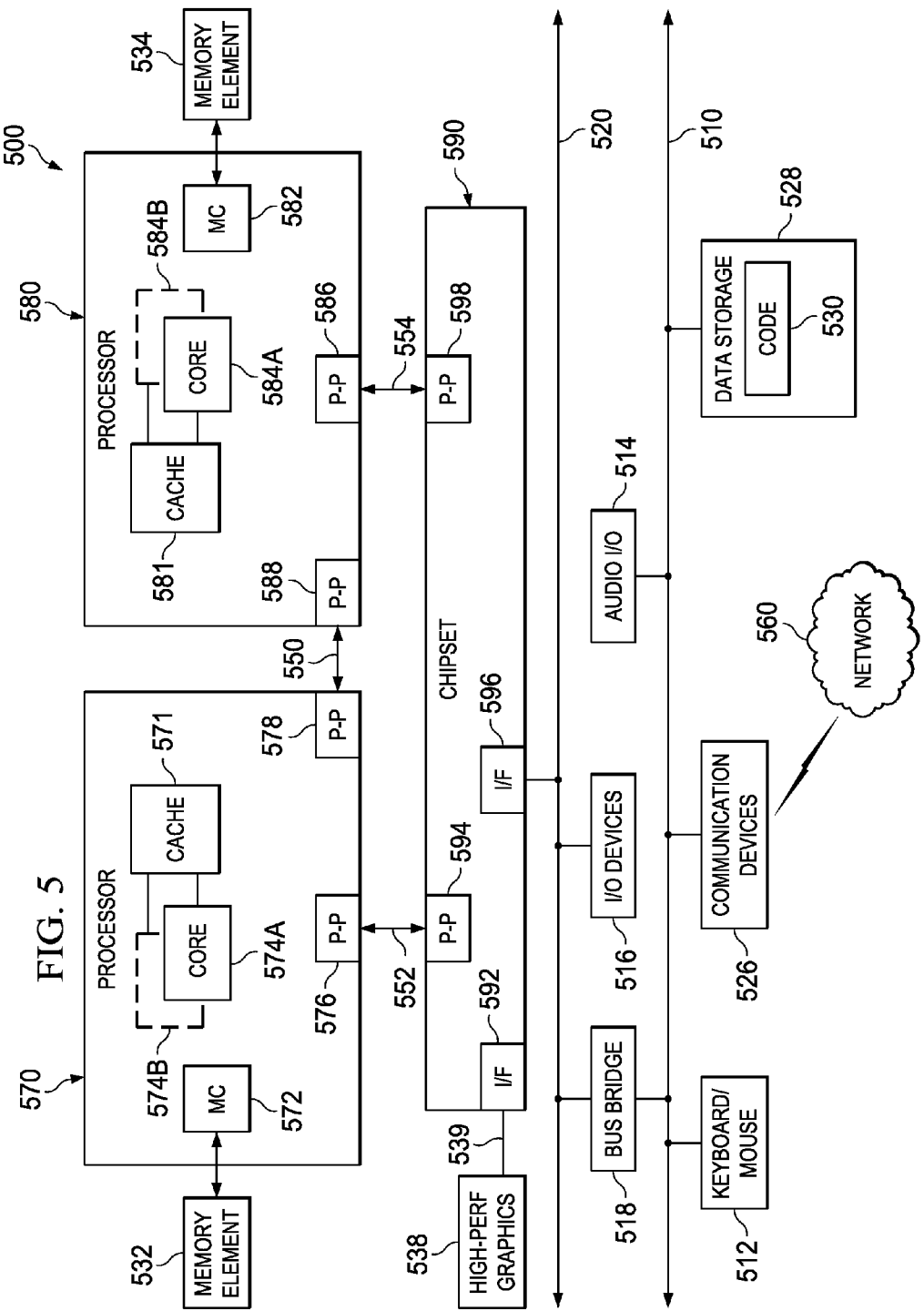
FIG. 5 is a block diagram illustrating an example computing system that is arranged in a point-to-point configuration in accordance with an embodiment.

FIG. 5 illustrates a computing system 500 that is arranged in a point-to-point (PtP) configuration according to an embodiment. In particular, FIG. 5 shows a system where processors, memory, and input/output devices are interconnected by a number of point-to-point interfaces. Generally, one or more of the network elements of communication system 100 may be configured in the same or similar manner as computing system 500.

As illustrated in FIG. 5, system 500 may include several processors, of which only two, processors 570 and 580, are shown for clarity. While two processors 570 and 580 are shown, it is to be understood that an embodiment of system 500 may also include only one such processor. Processors 570 and 580 may each include a set of cores (i.e., processor cores 574A and 574B and processor cores 584A and 584B) to execute multiple threads of a program. The cores may be configured to execute instruction code in a manner similar to that discussed above with reference to FIGS. 1-4. Each processor 570, 580 may include at least one shared cache 571, 581. Shared caches 571, 581 may store data (e.g., instructions) that are utilized by one or more components of processors 570, 580, such as processor cores 574 and 584.

Processors 570 and 580 may also each include integrated memory controller logic (MC) 572 and 582 to communicate with memory elements 532 and 534. Memory elements 532 and/or 534 may store various data used by processors 570 and 580. In alternative embodiments, memory controller logic 572 and 582 may be discrete logic separate from processors 570 and 580.

Processors 570 and 580 may be any type of processor and may exchange data via a point-to-point (PtP) interface 550 using point-to-point interface circuits 578 and 588, respectively. Processors 570 and 580 may each exchange data with a chipset 590 via individual point-to-point interfaces 552 and 554 using point-to-point interface circuits 576, 586, 594, and 598. Chipset 590 may also exchange data with a high-performance graphics circuit 538 via a high-performance graphics interface 539, using an interface circuit 592, which could be a PtP interface circuit. In alternative embodiments, any or all of the PtP links illustrated in FIG. 5 could be implemented as a multi-drop bus rather than a PtP link.

Chipset 590 may be in communication with a bus 520 via an interface circuit 596. Bus 520 may have one or more devices that communicate over it, such as a bus bridge 518 and I/O devices 516. Via a bus 510, bus bridge 518 may be in communication with other devices such as a keyboard/mouse 512 (or other input devices such as a touch screen, trackball, etc.), communication devices 526 (such as modems, network interface devices, or other types of communication devices that may communicate through a computer network 560), audio I/O devices 514, and/or a data storage device 528. Data storage device 528 may store code 530, which may be executed by processors 570 and/or 580. In alternative embodiments, any portions of the bus architectures could be implemented with one or more PtP links.

The computer system depicted in FIG. 5 is a schematic illustration of an embodiment of a computing system that may be utilized to implement various embodiments discussed herein. It will be appreciated that various components of the system depicted in FIG. 5 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 6:
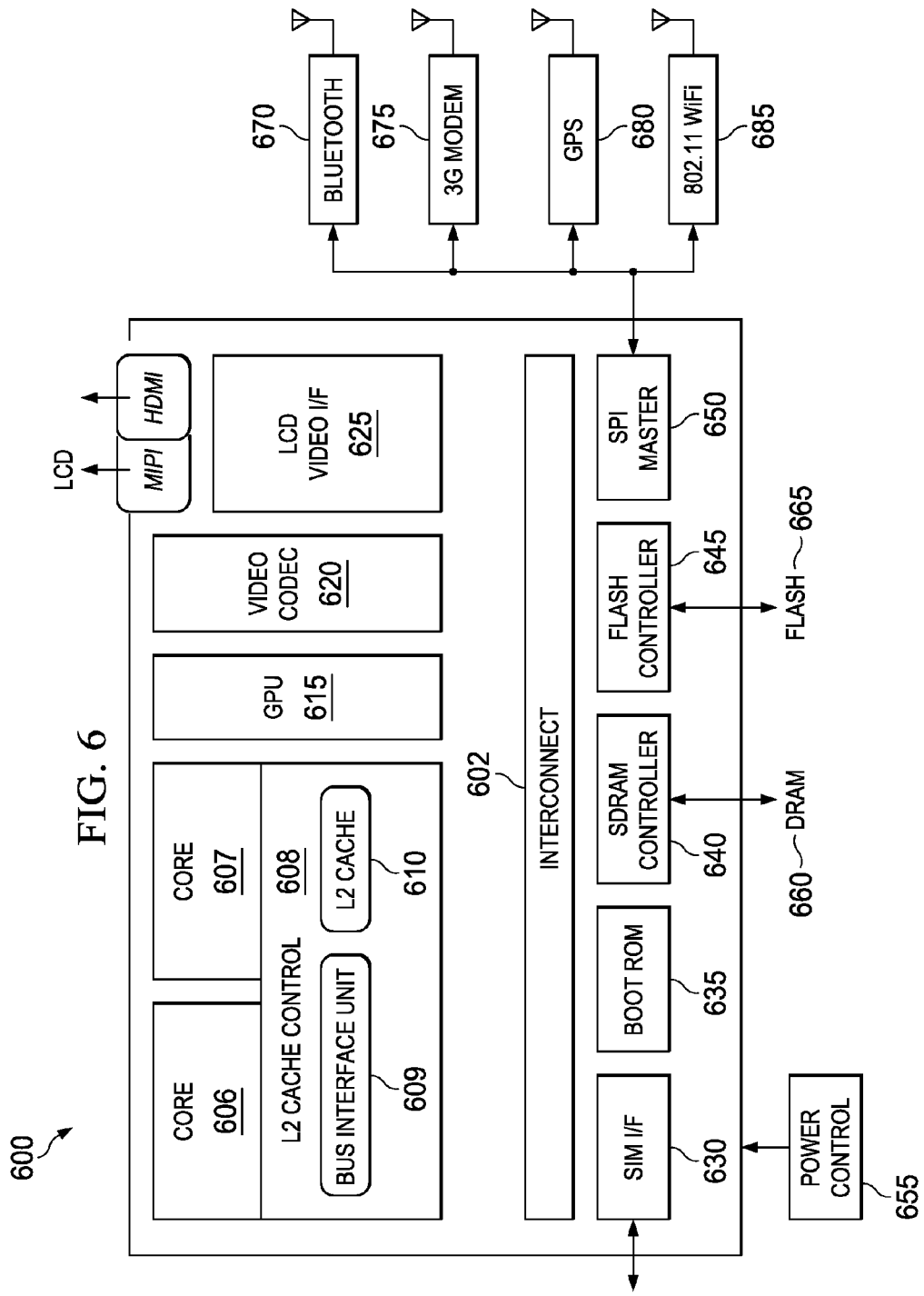
FIG. 6 is a simplified block diagram associated with an example ARM ecosystem system on chip (SOC) of the present disclosure.

Turning to FIG. 6, FIG. 6 is a simplified block diagram associated with an example ARM ecosystem SOC 600 of the present disclosure. At least one example implementation of the present disclosure can include the profiling event based exploit detection features discussed herein and an ARM component. For example, the example of FIG. 6 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 6, ARM ecosystem SOC 600 may include multiple cores 606-607, an L2 cache control 608, a bus interface unit 609, an L2 cache 610, a graphics processing unit (GPU) 615, an interconnect 602, a video codec 620, and a liquid crystal display (LCD) I/F 625, which may be associated with mobile industry processor interface (MIPI)/high-definition multimedia interface (HDMI) links that couple to an LCD.

ARM ecosystem SOC 600 may also include a subscriber identity module (SIM) I/F 630, a boot read-only memory (ROM) 635, a synchronous dynamic random access memory (SDRAM) controller 640, a flash controller 645, a serial peripheral interface (SPI) master 650, a suitable power control 655, a dynamic RAM (DRAM) 660, and flash 665. In addition, one or more example embodiments include one or more communication capabilities, interfaces, and features such as instances of Bluetooth™ 670, a 3G modem 675, a global positioning system (GPS) 680, and an 802.11 Wi-Fi 685.

In operation, the example of FIG. 6 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 7:
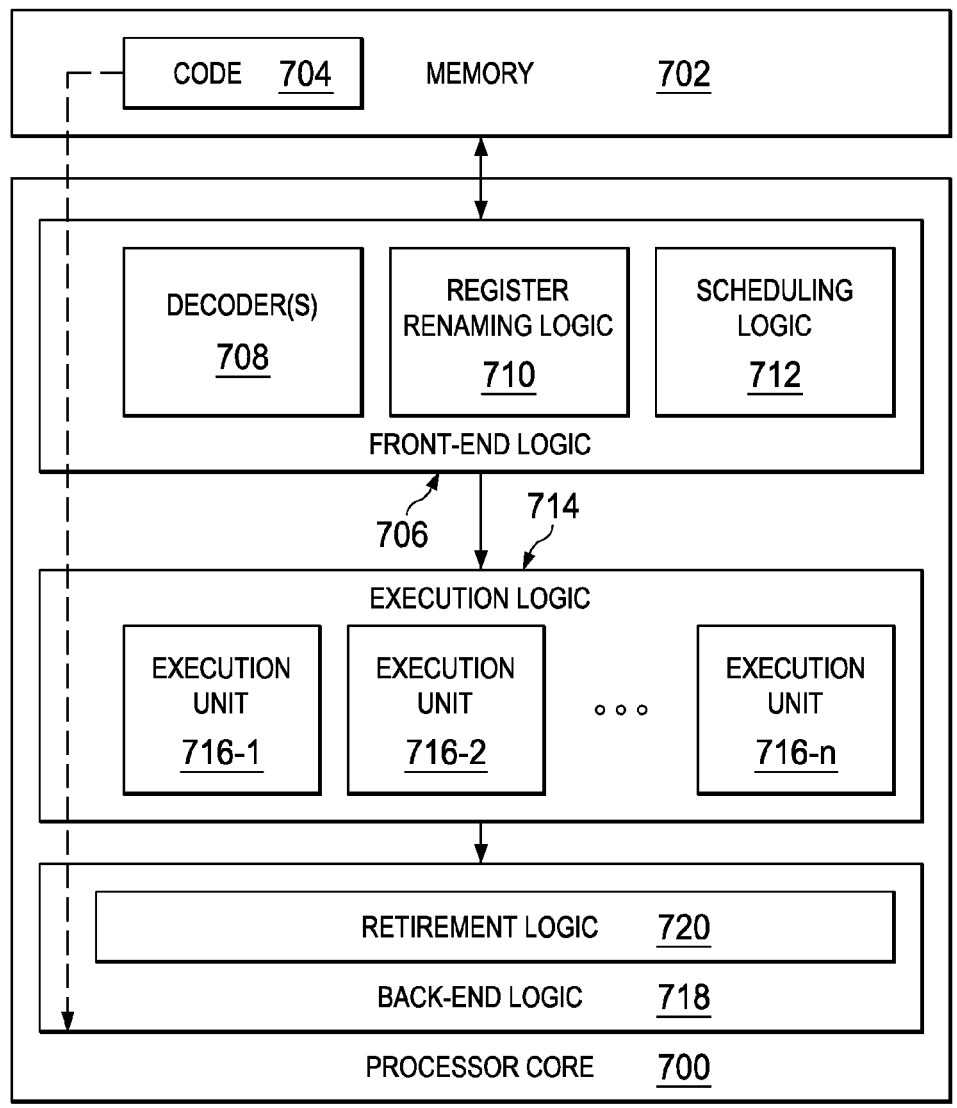
FIG. 7 is a block diagram illustrating an example processor core in accordance with an embodiment.

FIG. 7 illustrates a processor core 700 according to an embodiment. Processor core 700 may be the core for any type of processor, such as a micro-processor, an embedded processor, a digital signal processor (DSP), a network processor, or other device to execute code. Although only one processor core 700 is illustrated in FIG. 7, a processor may alternatively include more than one of the processor core 700 illustrated in FIG. 7. For example, processor core 700 represents one example embodiment of processors cores 574a, 574b, 584a, and 584b shown and described with reference to processors 570 and 580 of FIG. 5. Processor core 700 may be a single-threaded core or, for at least one embodiment, processor core 700 may be multithreaded in that it may include more than one hardware thread context (or "logical processor") per core.

FIG. 7 also illustrates a memory 702 coupled to processor core 700 in accordance with an embodiment. Memory 702 may be any of a wide variety of memories (including various layers of memory hierarchy) as are known or otherwise available to those of skill in the art. Memory 702 may include code 704, which may be one or more instructions, to be executed by processor core 700. Processor core 700 can follow a program sequence of instructions indicated by code 704. Each instruction enters a front-end logic 706 and is processed by one or more decoders 708. The decoder may generate, as its output, a micro operation such as a fixed width micro operation in a predefined format, or may generate other instructions, microinstructions, or control signals that reflect the original code instruction. Front-end logic 706 also includes register renaming logic 710 and scheduling logic 712, which generally allocate resources and queue the operation corresponding to the instruction for execution.

Processor core 700 can also include execution logic 714 having a set of execution units 716-1 through 716-N. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor core 700 allows out of order execution but requires in order retirement of instructions. Retirement logic 720 may take a variety of known forms (e.g., re-order buffers or the like). In this manner, processor core 700 is transformed during execution of code 704, at least in terms of the output generated by the decoder, hardware registers and tables utilized by register renaming logic 710, and any registers (not shown) modified by execution logic 714.

Although not illustrated in FIG. 7, a processor may include other elements on a chip with processor core 700, at least some of which were shown and described herein with reference to FIG. 5. For example, as shown in FIG. 5, a processor may include memory control logic along with processor core 700. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagrams (i.e., FIGS. 3 and 4) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable storage medium having one or more instructions that when executed by a processor cause the processor to execute an application in a system, perform event tracing for the application, analyze each instruction pointer from the event tracing, and determine if an instruction pointer points to an orphan page of memory.

In Example C2, the subject matter of Example C1 can optionally include where the orphan page is a region of code that is not associated with the application.

In Example C3, the subject matter of any one of Examples C1-C2 can optionally include where the orphan page is a region of code that is unidentified.

In Example C4, the subject matter of any one of Examples C1-C3 can optionally include where the system includes an operating system and an embedded application that is part of the operating system performs the event tracing.

In Example C5, the subject matter of any one of Examples C1-C4 can optionally include where the instructions, when executed by the processor, further cause the processor to determine if the instruction pointer points to unusual code that is not associated with the application.

In Example C6, the subject matter of any one of Example C1-C5 can optionally include where the event tracing is transparent to the application.

In Example C7, the subject matter of any one of Examples C1-C6 can optionally include where the event tracing is asynchronous with the application such that the target application continues execution without being blocked.

In Example C8, the subject matter of any one of Examples C1-C7 can optionally include where the instructions, when executed by the processor, further cause the processor to flag the application as malicious if the instruction pointer points to an orphan page of memory or the instruction pointer points to unusual code that is not associated with the application.

In Example A1, an apparatus can include a detection module, wherein the detection module is configured to execute an application in a system, perform event tracing for the application, analyze each instruction pointer from the event tracing, and determine if an instruction pointer points to an orphan page of memory.

In Example, A2, the subject matter of Example A1 can optionally include where the orphan page is a region of code that is not associated with the application.

In Example A3, the subject matter of any one of Examples A1-A2 can optionally include where the orphan page is a region of code that is unidentified.

In Example A4, the subject matter of any one of Examples A1-A3 can optionally include where the system includes an operating system and an embedded application that is part of the operating system performs the event tracing.

In Example A5, the subject matter of any one of Examples A1-A4 can optionally include where the detection module is further configured to determine if the instruction pointer points to unusual code that is not associated with the application.

In Example A6, the subject matter of any one of Examples A1-A5 can optionally include where the event tracing is transparent to the application.

In Example A7, the subject matter of any one of Examples A1-A6 can optionally include where the event tracing is asynchronous with the application such that the target application continues execution without being blocked.

Example M1 is a method including executing an application in a system, performing event tracing for the application, analyzing each instruction pointer from the event tracing, and determining if an instruction pointer points to an orphan page of memory.

In Example M2, the subject matter of Example M1 can optionally include where the orphan page is a region of code that is not associated with the application.

In Example M3, the subject matter of any one of the Examples M1-M2 can optionally include where the orphan page is a region of code that is unidentified.

In Example M4, the subject matter of any one of the Examples M1-M3 can optionally include where the system includes an operating system and an embedded application that is part of the operating system performs the event tracing.

In Example M5, the subject matter of any one of the Examples M1-M4 can optionally include determining if the instruction pointer points to unusual code that is not associated with the application.

In Example M6, the subject matter of any one of the Examples M1-M5 can optionally include where the event tracing is transparent to the application.

In Example M7, the subject matter of any one of the Examples M1-M6 can optionally include where the event tracing is asynchronous with the application such that the target application continues execution without being blocked.

Example S1 is a system for profiling event based exploit detection, the system including a detection module configured to execute an application in a system, perform event tracing for the application, analyze each instruction pointer from the event tracing, and determine if an instruction pointer points to an orphan page of memory.

In Example S2, the subject matter of Example S1 can optionally include where the orphan page is a region of code that is not associated with the application.

In Example S3, the subject matter of any of the Examples S1-S2 can optionally include where the system includes an operating system and an embedded application that is part of the operating system performs the event tracing.

Example X1 is a machine-readable storage medium including machine-readable instructions to implement a method or realize an apparatus as in any one of the Examples A1-A7, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory computer-readable medium comprising one or more instructions that when executed by a processor, cause the processor to:
    execute an application in a system;
    perform event tracing for the application;
    analyze each instruction pointer from the event tracing; and
    determine if an instruction pointer points to an orphan page of memory, wherein the orphan page of memory is a region of memory outside of loaded modules or memory regions associated with the application.

2. The at least one non-transitory computer-readable medium of claim 1, wherein the orphan page is a region of code that is not associated with the application.

3. The at least one non-transitory computer-readable medium of claim 1, wherein the orphan page is a region of code that is unidentified.

4. The at least one non-transitory computer-readable medium of claim 1, wherein the system includes an operating system and an embedded application that is part of the operating system performs the event tracing.

5. The at least one non-transitory computer-readable medium of claim 1, further comprising one or more instructions that when executed by the processor:
    determine if the instruction pointer points to unusual code that is not associated with the application.

6. The at least one non-transitory computer-readable medium of claim 1, wherein the event tracing is transparent to the application.

7. The at least one non-transitory computer-readable medium of claim 1, wherein the event tracing is asynchronous with the application such that the target application continues execution without being blocked.

8. The at least one non-transitory computer-readable medium of claim 1, further comprising one or more instructions that when executed by the processor:
    flag the application as malicious if the instruction pointer points to an orphan page of memory or the instruction pointer points to unusual code that is not associated with the application.

9. An apparatus comprising:
    a detection module, wherein the detection module is configured to:
    execute an application in a system;
    perform event tracing for the application;
    analyze each instruction pointer from the event tracing; and
    determine if an instruction pointer points to an orphan page of memory, wherein the orphan page of memory is a region of memory outside of loaded modules or memory regions associated with the application.

10. The apparatus of claim 9, wherein the orphan page is a region of code that is not associated with the application.

11. The apparatus of claim 9, wherein the orphan page is a region of code that is unidentified.

12. The apparatus of claim 9, wherein the system includes an operating system and an embedded application that is part of the operating system performs the event tracing.

13. The apparatus of claim 9, wherein the detection module is further configured to:
    determine if the instruction pointer points to unusual code that is not associated with the application.

14. The apparatus of claim 9, wherein the event tracing is transparent to the application.

15. The apparatus of claim 9, wherein the event tracing is asynchronous with the application such that the target application continues execution without being blocked.

16. A method comprising:
    executing an application in a system;
    performing event tracing for the application;
    analyzing each instruction pointer from the event tracing; and
    determining if an instruction pointer points to an orphan page of memory, wherein the orphan page of memory is a region of memory outside of loaded modules or memory regions associated with the application.

17. The method of claim 16, wherein the orphan page is a region of code that is not associated with the application.

18. The method of claim 16, wherein the orphan page is a region of code that is unidentified.

19. The method of claim 16, wherein the system includes an operating system and an embedded application that is part of the operating system performs the event tracing.

20. The method of claim 16, further comprising:
    determining if the instruction pointer points to unusual code that is not associated with the application.

21. The method of claim 16, wherein the event tracing is transparent to the application.

22. The method of claim 16, wherein the event tracing is asynchronous with the application such that the target application continues execution without being blocked.

23. A system for profiling event based exploit detection, the system comprising:
- a detection module, wherein the detection module is configured to:
- execute an application in a system;
- perform event tracing for the application;
- analyze each instruction pointer from the event tracing; and
- determine if an instruction pointer points to an orphan page of memory, wherein the orphan page of memory is a region of memory outside of loaded modules or memory regions associated with the application.

24. The system of claim 23, wherein the orphan page is a region of code that is not associated with the application.

25. The system of claim 23, wherein the system includes an operating system and an embedded application that is part of the operating system performs the event tracing.

\* \* \* \* \*